(12) United States Patent  
Sasaki et al.

(10) Patent No.: US 9,136,768 B2  
(45) Date of Patent: Sep. 15, 2015

(54) SWITCHING POWER SUPPLY DEVICE

(71) Applicant: TDK Corporation, Tokyo (JP)

(72) Inventors: Gakuou Sasaki, Tokyo (JP); Yuuta Takano, Tokyo (JP)

(73) Assignee: TDK Corporation (JP)

( * ) Notice: Subject to any disclaimer, the term of this patent is extended or adjusted under 35 U.S.C. 154(b) by 276 days.

(21) Appl. No.: 13/767,413

(22) Filed: Feb. 14, 2013

(65) Prior Publication Data

US 2013/0215648 A1   Aug. 22, 2013

(30) Foreign Application Priority Data

Feb. 17, 2012 (JP) ................................. 2012-033424

(51) Int. Cl.

| | |
|---|---|
| H02J 3/16 | (2006.01) |
| H02P 9/18 | (2006.01) |
| H02M 3/335 | (2006.01) |
| H02M 1/00 | (2007.01) |
| H02M 1/42 | (2007.01) |

(52) U.S. Cl.  
CPC ........ *H02M 3/33538* (2013.01); *H02M 1/4225* (2013.01); *H02M 2001/007* (2013.01); *Y02B 70/126* (2013.01)

(58) Field of Classification Search  
CPC .................... H02M 1/4225; H02M 2001/007; H02M 3/33538  
USPC ............. 363/21.01, 21.03, 21.04, 95, 97, 124  
See application file for complete search history.

(56) References Cited

U.S. PATENT DOCUMENTS

| | | | | |
|---|---|---|---|---|
| 5,910,891 | A * | 6/1999 | Jo ..................................... | 363/89 |
| 6,031,748 | A * | 2/2000 | Hong .............................. | 363/89 |
| 6,118,673 | A * | 9/2000 | Hua ........................... | 363/56.11 |
| 6,229,724 | B1 * | 5/2001 | Virtanen ......................... | 363/89 |
| 2009/0316455 | A1 * | 12/2009 | Kim et al. ....................... | 363/89 |
| 2010/0226149 | A1 * | 9/2010 | Masumoto ..................... | 363/20 |
| 2010/0265741 | A1 * | 10/2010 | Usui .......................... | 363/21.12 |

FOREIGN PATENT DOCUMENTS

| | | | | |
|---|---|---|---|---|
| CN | 101010989 A | | 8/2007 | |
| JP | 08-111975 | * | 4/1996 | ............ H02M 3/155 |

(Continued)

OTHER PUBLICATIONS

Chinese Office Action for Application No. 201310051872.6 dated Nov. 17, 2014 with English translation (12 pages).

*Primary Examiner* — Timothy J Dole  
*Assistant Examiner* — Sisay G Tiku  
(74) *Attorney, Agent, or Firm* — Harness, Dickey & Pierce, P.L.C.

(57) ABSTRACT

A switching power supply device includes: a power factor correction circuit having a step-up chopper circuit including a chopper switching element and a power factor correction control unit controlling a switching operation of the chopper switching element; a DC/DC converter having a transformer, a switching circuit, a rectifier circuit, a smoothing circuit, and a DC/DC converter control unit; and a control ON/OFF circuit controlling the ON/OFF states of an output voltage of the DC/DC converter circuit. The switching circuit is provided at a primary winding side of the transformer. The rectifier circuit and the smoothing circuit are provided at a secondary winding side of the transformer. The control ON/OFF circuit controls the ON/OF states of the output voltage of the DC/DC converter circuit by controlling the power factor correction control unit and the DC-DC converter control unit based on an external signal.

19 Claims, 6 Drawing Sheets

(56) References Cited

FOREIGN PATENT DOCUMENTS

| JP | 2001-314083 | | 11/2001 | | |
| JP | 2002-272107 | | 9/2002 | | |
| JP | 2005-348560 | * | 12/2005 | .............. | H02M 3/28 |
| JP | 2011-015540 | A | 1/2011 | | |
| WO | WO-2011-065024 | A1 | 6/2011 | | |

* cited by examiner

| Control | Standby Power Consumption (W) |
|---|---|
| Standby State: Only DC/DC | 1.38 |
| Standby State: PFC + DC/DC | 0.12 |

Input Voltage: 100V

SWITCHING POWER SUPPLY DEVICE

CROSS-REFERENCE TO RELATED APPLICATION

This application claims priority to Japanese Patent Application No. 2012-033424 filed Feb. 17, 2012 which is hereby expressly incorporated by reference herein in its entirety.

BACKGROUND

The present invention relates to a switching power supply device. Specifically, the present invention relates to a switching power supply device in which standby power consumption can be decreased by remote control when an output voltage is in an OFF state.

A switching power supply device that has a power factor correction (PFC) circuit is known. The conventional switching power supply device is configured with the PFC circuit and a DC/DC converter circuit. Specifically, the PFC circuit corresponds to an AC/DC converter and improves a power factor. The DC/DC converter circuit stabilizes a direct current (DC) output voltage and isolates an input and an output thereof from each other.

Japanese Patent Publication No. 2001-314083 discloses a typical PFC circuit. Further, Japanese Patent Publication No. 2002-272107 discloses a typical DC/DC converter circuit. FIG. 6 shows a circuit diagram of a conventional switching power supply device 60 that is configured with the PFC circuit that is disclosed in Japanese Patent Publication No. 2001-314083 and the DC/DC converter circuit that is disclosed in Japanese Patent Publication No. 2002-272107. As shown in FIG. 6, in the conventional switching power supply device 60, an input voltage Vin that is generated by an AC power source is input to a rectifier circuit 3 that is composed of a diode bridge. Further, a voltage that is obtained by performing a full-wave rectification of the input voltage Vin through the rectifier circuit 3 is supplied to a step-up chopper circuit 62 of a PFC circuit 61. As a structure of the step-up chopper circuit 62, one output terminal of the rectifier circuit 3 is connected to one end of an inductor 63. Another end of the inductor 63 is connected to a drain of a field effect transistor (FET) 7 that corresponds to a switching element. Further, a source of the FET 7 is connected to another output terminal of the rectifier circuit 3. Further, a diode 9 and a smoothing capacitor 10, which are connected in series, are connected in parallel between the source and the drain of the FET 7. The PFC circuit 61 has a control unit 65 that stabilizes a DC voltage Vdc and improves a power factor by performing switching control of the FET 7. As discussed above, the PFC circuit 61 is configured with the step-up chopper circuit 62 and the control unit 65.

In the step-up chopper circuit 62, when the FET 7 is turned ON, energy is stored to the inductor 63 according to a current that is obtained by performing a full-wave rectification of the input voltage Vin through the rectifier circuit 3. On the other hand, when the FET 7 is turned OFF, the DC voltage Vdc, which is higher than a voltage that is input to the step-up chopper circuit 62 from the rectifier circuit 3, is generated between both ends of the smoothing capacitor 10 by overlapping the stored energy that is stored in the inductor 63 with a voltage that is generated between output terminals of the rectifier circuit 3. At this time, the DC voltage Vdc is smoothed by the smoothing capacitor 10.

The control unit 65 monitors the DC voltage Vdc that is smoothed by the smoothing capacitor 10 as a feedback signal and makes the DC voltage Vdc constant by controlling a pulse conduction width of the FET 7. Specifically, the control unit 65 performs the following control: the control unit 65 narrows the pulse conduction width of the FET 7 when the DC voltage Vdc increases as compared with a predetermined voltage that is a reference voltage. On the other hand, the control unit 65 widens the pulse conduction width of the FET 7 when the DC voltage Vdc decreases as compared with the predetermined voltage that is the reference voltage. Further, the control unit 65 improves a power factor by making a current waveform of a current that flows in the inductor 63 close to a voltage waveform as a sine wave of the voltage that is obtained by performing the full-wave rectification of the input voltage Vin through the rectifier circuit 3 by performing the switching control of the FET 7.

Further, as shown in FIGS. 6 and 7, the DC/DC converter circuit 70 disclosed in Japanese Patent Publication No. 2002-272107 is configured with a switching circuit 13 (shown in FIG. 7), a transformer 73, a rectifier circuit 15 (shown in FIG. 7), a smoothing circuit 16 (shown in FIG. 7) and a pulse width modulation (PWM) control unit 75. As the structure of the switching circuit 13, one end (positive (+) side) of the smoothing capacitor 10 of the step-up chopper circuit 62 is connected to one end of a primary side winding of the transformer 73. A drain of an FET 17 is connected to another end of the primary side winding of the transformer 73. Further, another end (negative (−) side) of the smoothing capacitor 10 of the step-up chopper circuit 62 is connected to a source of the FET 17. The switching circuit 13 is configured with the above structure.

Further, one end of a secondary side winding of the transformer 73 is connected to an anode of a rectifier diode 19. An anode of a freewheel diode 20 is connected to another end of the secondary side winding of the transformer 73. A cathode of the rectifier diode 19 and a cathode of the freewheel diode 20 are connected to each other. The rectifier circuit 15 is configured with the above structure. The smoothing circuit 16 is structured as follows. An inductor 21 and a smoothing capacitor 22 are respectively connected to each of the ends of the freewheel diode 20.

Further, the PWM control unit 75 monitors an output voltage Vo as a feedback signal and makes the output voltage Vo constant by controlling a pulse conduction width of a driving signal that is supplied to a gate of the FET 17.

In the DC/DC converter circuit 70, when the FET 17 is turned ON, the rectifier diode 19 is turned ON and the freewheel diode 20 is turned OFF because a voltage of a positive polarity is induced at a terminal marked with a dot of the secondary winding of the transformer 73. As a result, the output voltage Vo is supplied to a load 100 through the rectifier diode 19 and the inductor 21. On the other hand, when the FET 17 is turned OFF, the rectifier diode 19 is turned OFF and the freewheel diode 20 is turned ON because a voltage is inducted to a terminal marked without a dot of the secondary winding of the transformer 73. As a result, the energy that is stored in the inductor 21 is supplied to the load 100 as the output voltage Vo.

Thus, in the DC/DC converter circuit 70, the voltage that is induced at the secondary winding of the transformer 73 by a switching operation of the FET 17 is rectified by the rectifier circuit 15 so as to make the output voltage Vo stable by the smoothing circuit 16.

Further, a switching power supply device that has the configuration as explained above in addition to an ON/OFF control function of the output voltage Vo (i.e., the ON/OFF corresponds to providing (being output) or Not-Providing (not being output) the output voltage) by a remote control has been known. FIG. 7 is a block diagram of a conventional switching power supply device 80 in which the ON/OFF control function of the output voltage Vo is realized by remote control. As shown in FIG. 7, in the switching power supply device 80, an external signal for the remote control is input to a control circuit 81 by performing an ON/OFF operation of an external signal ON/OFF circuit 85 that is provided outside. The ON/OFF operation of the external signal ON/OFF circuit 85 means that the external signal is or is not allowed to pass through toward the control circuit 81. Then, the control circuit 81 controls the PWM control unit 75. The PWM control unit 75 performs an ON/OFF operation for outputting a pulse signal that corresponds to a driving signal that is supplied to a gate of the FET 17 (shown in FIG. 6) of the DC/DC converter circuit 70. The ON/OFF operation for outputting the pulse signal as discussed above means that the pulse signal is or is not allowed to be supplied to the gate of the FET 17. As a result, the PWM control unit 75 controls the output voltage Vo of the DC/DC converter circuit 70.

A conventional remote control for the switching power supply device 80 is to externally perform ON/OFF control of the output voltage of the switching power supply device 80 while the input voltage Vin of the switching power supply device is applied. The ON/OFF control of the output voltage means that the output voltage is or is not output. The ON/OFF control of the output voltage is performed by controlling the DC/DC converter circuit 70. However, the PFC circuit 61, which improves a power factor by converting an AC voltage that corresponds to the input voltage Vin of the switching power supply device 80 into a DC voltage, keeps operating although the output voltage is in an OFF state (not output) by the remote control. Standby power consumption of the switching power supply device 80 that is controlled by the remote control is extremely large. This is because in spite of the OFF state of the output voltage by the remote control, the operation, i.e., converting the input voltage Vin to the output voltage, of the PFC circuit 61 is continued.

Accordingly, an object of the present invention is to provide a switching power supply device that can be realized as follows: in the switching power supply device that can control an ON/OFF operation for an output voltage Vo by remote control, the output voltage Vo can be stopped by an OFF operation through an external signal for the remote control while an input voltage Vin of the switching power supply device is applied. As a result, standby power consumption can be reduced. Resuming output of the output voltage Vo is stably performed by an external signal for the remote control.

SUMMARY

To solve the above problems, a switching power supply device according to a first aspect of the present invention includes: a power factor correction circuit that has a step-up chopper circuit including a chopper switching element and a power factor correction control unit that controls a switching operation of the chopper switching element; a DC/DC converter that has a transformer, a switching circuit, a rectifier circuit, a smoothing circuit, and a DC/DC converter control unit; and a control ON/OFF circuit that controls ON/OFF states of an output voltage of the DC/DC converter circuit. The switching circuit is provided at a side of a primary winding of the transformer. The rectifier circuit and the smoothing circuit are provided at a side of a secondary winding of the transformer. The DC/DC converter control unit controls the switching circuit. The control ON/OFF circuit controls the ON/OF states of the output voltage of the DC/DC converter circuit by controlling the power factor correction control unit and the DC-DC converter control unit based on an external signal.

In the switching power supply device according to the first aspect of the present invention, the control ON/OFF circuit has a first switching element and a second switching element. When the first switching element is turned ON, the control ON/OFF circuit prevents a first driving signal for driving the step-up chopper circuit from being output from the power factor correction control unit. Further, when the second switching element is turned ON, the control ON/OFF circuit prevents a second driving signal for driving the DC/DC converter circuit from being output from the DC/DC converter control unit.

In the switching power supply device according to the first aspect of the present invention, when the external signal is not input to the control ON/OFF circuit, the first and second switching elements are turned ON.

In the switching power supply device according to the first aspect of the present invention, the ON/OFF states of the second driving signal are determined by a reference signal. When the reference signal is lower than a predetermined reference level, the control ON/OFF circuit prevents the second driving signal from being output from the DC/DC converter control unit.

In the switching power supply device according to the first aspect of the present invention, the control ON/OFF circuit has a first switching element, a second switching element and a delay circuit. When the external signal is input to the control ON/OFF circuit, a first signal for the first switching element and a second signal for the second switching element are generated based on the external signal. Further, when a start signal is input to the power factor correction control unit by turning OFF the first switching element by the first signal, the power factor correction control unit outputs a first driving signal to the step-up chopper circuit so as to drive the step-up chopper circuit. Still further, when the second switching element, which is connected to the DC/DC converter control unit, is turned OFF by the second signal that is delayed by the delay circuit after the step-up chopper circuit is driven, the DC/DC converter control unit outputs a second driving signal to the DC/DC converter circuit so as to turn ON the output voltage of the DC/DC converter circuit by driving the DC/DC converter circuit.

In the switching power supply device according to the first aspect of the present invention, the control ON/OFF circuit has a first switching element, a second switching element and a delay circuit. When the external signal is input to the control ON/OFF circuit, a first signal for the first switching element and a second signal for the second switching element are generated based on the external signal. Further, when the first switching element is turned ON, the control ON/OFF circuit prevents a start signal for controlling a first driving signal for driving the step-up chopper circuit from being input into the power factor correction control unit so as to prevent the first driving signal from being output from the power factor correction control unit to the step-up chopper circuit. Still further, when the second switching element is turned ON by the second signal that is delayed by the delay circuit after the control ON/OFF circuit prevents the first driving signal from being output to the step-up chopper circuit, the control ON/OFF circuit prevents the second driving signal for driving the DC/DC converter circuit from being output from the DC/DC converter control unit to the switching circuit so as to turn OFF the output voltage of the DC/DC converter circuit.

The switching power supply device of the present invention can reduce standby power consumption of the switching power supply device. This is because a PFC control unit and a DC/DC converter control unit are controlled to be in a standby state by a control ON/OFF circuit based on an external signal for remote control that is input from outside while the input voltage Vin of the switching power supply unit is applied and then switching operations of the PFC circuit and DC/DC converter circuit are stopped.

The control ON/OFF circuit of the switching power supply device of the present invention inputs a start signal corresponding to the DC voltage Vdc to the PFC control unit based on the external signal for the remote control that is input from outside. Then, the PFC control unit operates the step-up chopper circuit and provides a predetermined DC voltage Vdc to the DC/DC converter circuit. Further, the control ON/OFF circuit performs the control as follows: after a first driving signal is output and an operation of the step-up chopper circuit becomes stable, the FET 48 turns OFF; when a reference signal that is for a CS terminal of the DC/DC converter control unit becomes a High level, a second driving signal is output from the DC/DC converter control unit to the FET 17 so as to turn ON the output voltage Vo of the DC/DC converter circuit; and as a result, because the external signal is turned ON, by the remote control, resuming output of the output voltage Vo is stably performed.

DESCRIPTION OF EXEMPLARY EMBODIMENTS

A switching power supply device 1 according to an embodiment of the present invention is explained below with reference to the drawings. The switching power supply device 1 according to the embodiment of the present invention has an ON/OFF function of an output voltage Vo by remote control. Note that the ON/OFF function of the output voltage Vo means that the output voltage is or is not output. While an input voltage Vin of the switching power supply device 1 is applied, the output voltage Vo is turned OFF by an OFF operation of an external signal for remote control. As a result, standby power consumption of the switching power supply device 1 can be reduced. Further, resuming output of the output voltage Vo of the switching power supply device 1 can be stably performed by an ON operation of the external signal for remote control.

Circuit Configuration of Switching Power Supply Device

Figure 1:
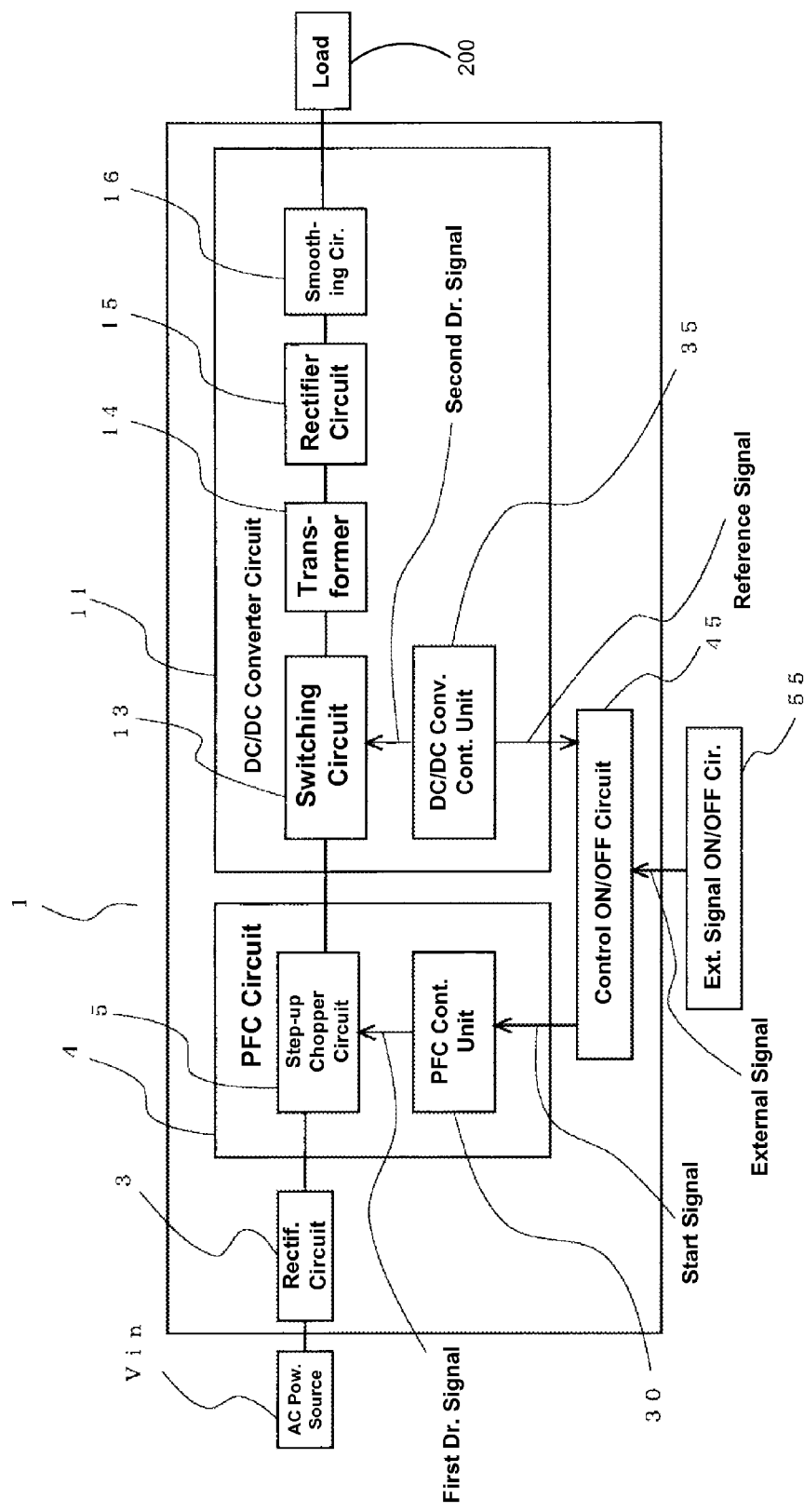
FIG. 1 is a block diagram that shows a configuration of a switching power supply device according to an embodiment of the present invention.
Figure 2:
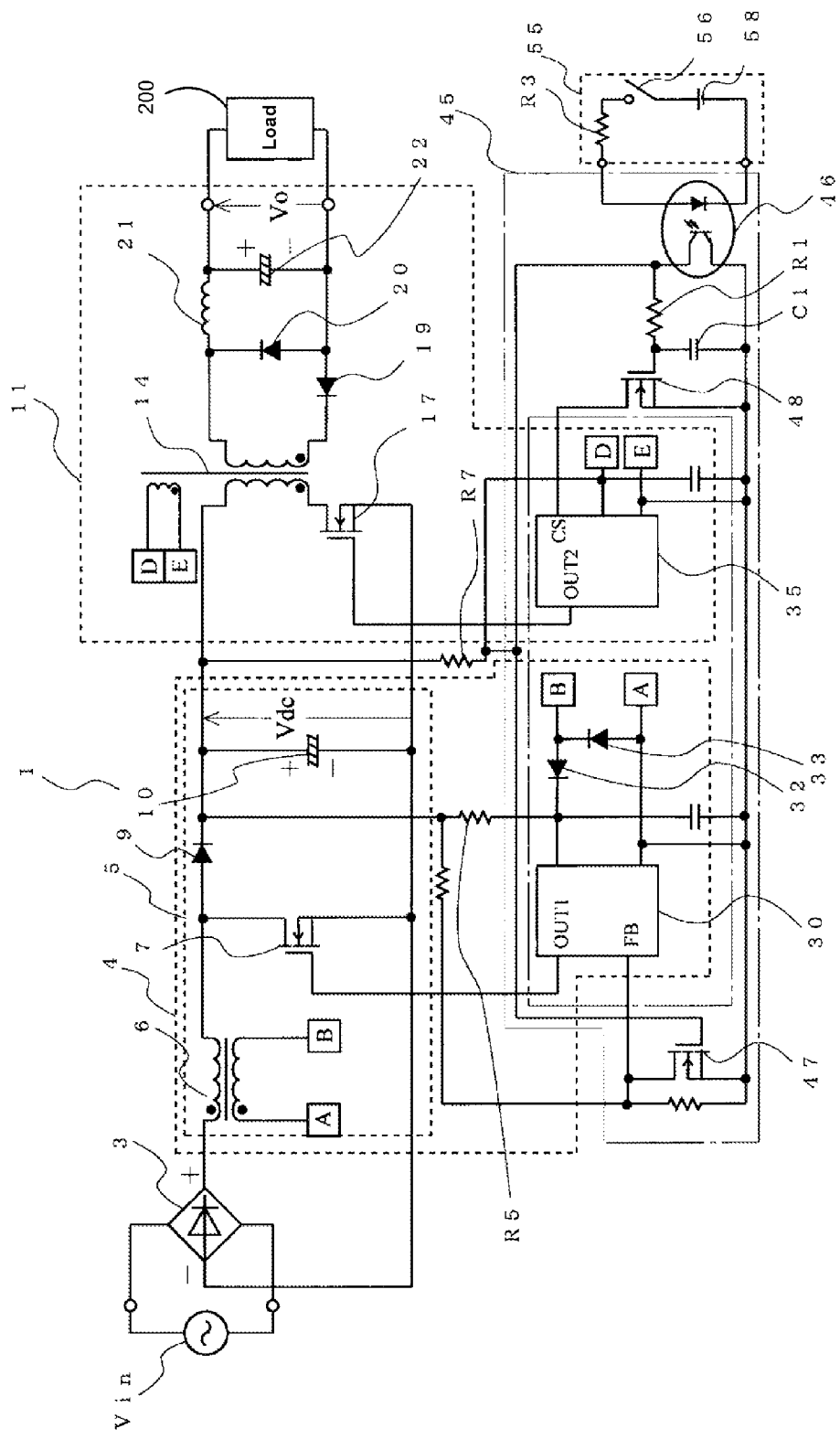
FIG. 2 is a circuit diagram that shows a configuration of a switching power supply device according to an embodiment of the present invention.
Figure 6:
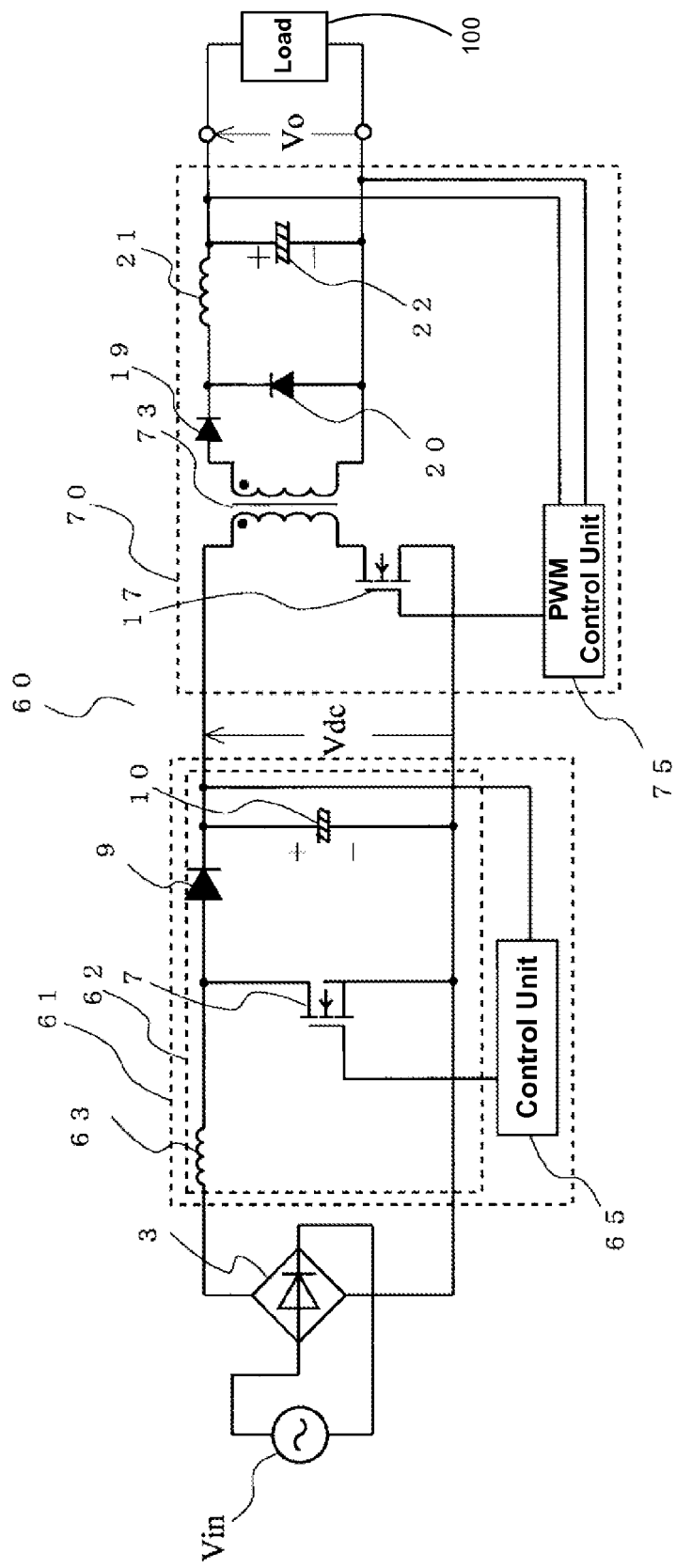
FIG. 6 is a circuit diagram that shows a configuration of a conventional switching power supply device that is configured with a PFC circuit and a DC/DC converter circuit.
Figure 7:
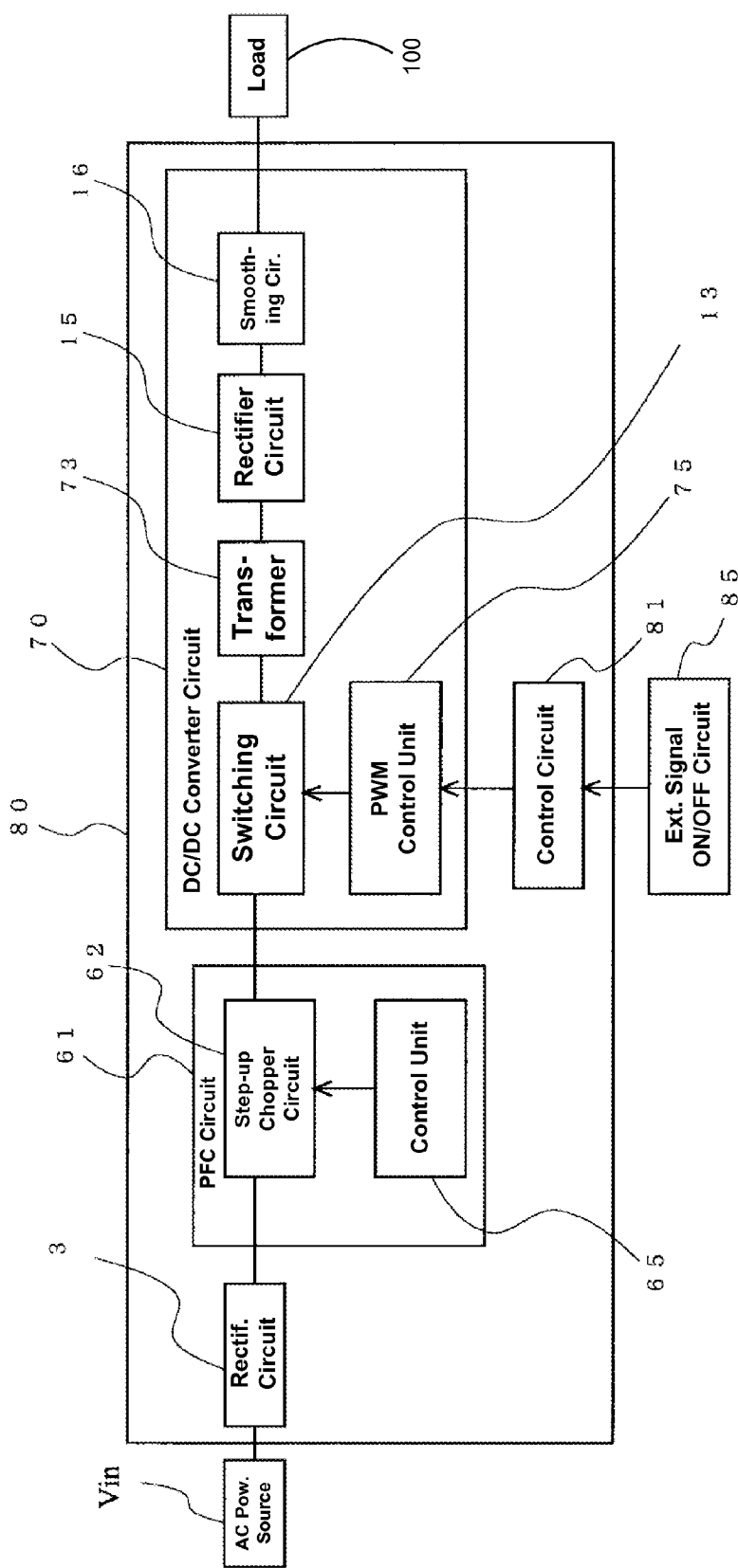
FIG. 7 is a block diagram that shows a configuration of a conventional switching power supply device that can perform ON/OFF operations of an output voltage by remote control.

First, a circuit configuration of the switching power supply device 1 according to the embodiment of the present invention is explained with reference to FIGS. 1 and 2. FIG. 1 is a block diagram that shows a configuration of the switching power supply device 1 according to the embodiment of the present invention. FIG. 2 is a circuit diagram that shows a configuration of the switching power supply device 1 according to the embodiment of the present invention. Regarding the same parts of the configurations in the switching power supply device 1 according to the embodiment of the present invention and in the conventional switching power supply devices 60, 80 shown in FIGS. 6 and 7, the same reference numerals are used and detailed explanations regarding the same configurations are omitted.

As shown in FIGS. 1 and 2, the switching power supply device 1 according to the embodiment of the present invention is configured with a rectifier circuit 3, a power factor correction (PFC) circuit 4, a DC/DC converter circuit 11 and a control ON/OFF circuit 45. Specifically, the rectifier circuit 3 is composed of a diode bridge to which the input voltage Vin, which is generated at an AC power source, is input. The PFC circuit 4 is configured with a step-up chopper circuit 5 and a PFC control unit 30 that controls the step-up chopper circuit 5. The DC/DC converter circuit 11 is configured with a switching circuit 13, a transformer 14, a rectifier circuit 15, a smoothing circuit 16 and a DC/DC converter control unit 35. The control ON/OFF circuit 45 controls the PFC control unit 30 and the DC/DC converter control unit 35 based on an external signal for remote control that is input from outside. Then, the control ON/OFF circuit 45 performs ON/OFF control of the output voltage Vo of the DC/DC converter circuit 11. As a detailed configuration, one end (positive (+) side) of the smoothing capacitor 10 of the step-up chopper circuit 5 is connected to one end of a primary winding of the transformer 14. A drain of a FET 17 is connected to another end of the primary winding of the transformer 14. Another end (negative (−) side) of the smoothing capacitor 10 of the step-up chopper circuit 5 is connected to a source of the FET 17. Note that the switching circuit 13 is configured with the FET 17. However, the switching circuit 13 may additionally include the DC/DC converter control unit 35.

Each Circuit of Switching Power Supply Device

The control ON/OFF circuit 45 that performs the ON/OFF control of the output voltage Vo of the switching power supply device 1, the PFC control unit 30 and the DC/DC converter control unit 35 are explained in detail with reference to FIG. 2 below.

As shown in FIG. 2, the control ON/OFF circuit 45 has a photocoupler 46, a FET 47, a FET 48 and a capacitor C1. Specifically, the external signal for the remote control from an external signal ON/OFF circuit 55 is input to the photocoupler 46. The FET 47 corresponds to a first switching element that is connected to a collector of a transistor of a receiver of the photocoupler 46. The FET 48 corresponds to a second switching element that is connected to the photocoupler 46 through a resistor R1. The capacitor C1 is connected to a node connecting the FET 48 and the resistor R1. An integration circuit is composed of the resister R1 and the capacitor C1 that are connected to a gate of the FET 48. The integration circuit functions as a delay circuit that delays a signal from the transistor of the photocoupler 46.

The external signal ON/OFF circuit 55 performs the ON/OFF operation of the output voltage Vo of the switching power supply device 1 from outside. Further, in the external signal ON/OFF circuit 55, a DC power source 58, a switch 56 and a resister R3 are connected in series to both ends of a light-emitting part of the photocoupler 46. By turning ON the switch 56, because a current flows into a diode of the light-emitting part of the photocoupler 46, a transistor of the light-emitting part of the photocoupler 46 can be turned ON.

The PFC control unit 30 can improve a power factor of the switching power supply device 1 by controlling a conduction time (a pulse conduction width) of a FET 7 that corresponds to a (chopper) switching element. The conduction time of the FET 7 is controlled by detecting a DC voltage Vdc of the step-up chopper circuit 5 and a current flowing in a choke coil 6 as a voltage. As a power source voltage for the PFC control unit 30, a voltage of the smoothing capacitor 10 is supplied through a resistor R5. Further, a voltage that is induced to terminals A and B of a secondary winding of the choke coil 6 is supplied to power terminals of the PFC control unit 30 through rectifier diodes 32 and 33. The PFC control unit 30 is provided with a FB terminal, a terminal OUT1 and the power terminals. Specifically, the FB terminal detects the DC voltage Vdc as a start signal. The terminal OUT1 outputs a pulse signal (a first driving signal) based on the start signal that is input to the FB terminal. A voltage that activates the PFC control unit 30 is supplied to the power terminals. When the voltage is supplied to the power terminals and the start signal is input to the FB terminal, the PFC control unit 30 outputs the pulse signal (the first driving signal) from the terminal OUT1. When the voltage is supplied to the power terminals and the start signal is not input to the FB terminal, the PFC control unit 30 prevents the pulse signal (the first driving signal) from being output from the terminal OUT1. Therefore, the PFC control unit 30 prevents the start signal from being input from the DC voltage Vdc that is smoothed by the smoothing capacitor 10 of the step-up chopper circuit 5 to the FB terminal by turning ON the FET 47 (a first switching element). The PFC control unit 30 also prevents the pulse signal (the first driving signal) from being output from the terminal OUT1 of the PFC control unit 30 to the FET 7. As a result, the switching operation of the FET 7 of the step-up chopper circuit 5 is stopped. However, because a voltage is supplied to the power terminals of the PFC control unit 30, the PFC control unit 30 is in a standby state where the output of the pulse signal (the first driving signal) from the terminal OUT1 is suspended. When the standby state is canceled, the FET is turned OFF. Thus, the start signal corresponding to the DC voltage Vdc of the step-up chopper circuit 5 is input to the FB terminal of the PFC control unit 30 (by turning OFF the FET 47). As a result, the PFC control unit 30 outputs the pulse signal (the first driving signal) to the FET 7. As a result, the standby state of the PFC control unit 30 is canceled and the switching operation by the FET 7 of the step-up chopper circuit 5 is performed. Therefore, the predetermined DC voltage Vdc is output. Note that the PFC control unit 30 is configured with an IC (integrated circuit).

The DC/DC converter control unit 35 monitors the output voltage Vo and stabilizes the output voltage Vo by adjusting a pulse conduction width of a pulse signal (a second driving signal) that is supplied to the gate of the FET 17 that corresponds to a switching element. As a voltage for the power terminals of the DC/DC converter control unit 35, the voltage of the smoothing capacitor 10 is supplied through a resister R7. Further, a voltage that is induced to terminals D, E of an auxiliary winding of the transformer 14 is also provided to the power terminals of the DC/DC converter control unit 35 by performing switching operations of the FET 17. The DC/DC converter control unit 35 is provided with a CS terminal, a terminal OUT2 and the power terminals. Specifically, the CS terminal is for a reference signal. The terminal OUT2 outputs a pulse signal (a second driving signal) based on the reference signal that is for the CS terminal. The power terminals are supplied with a voltage that is for activating the DC converter control unit 35. By making the reference signal that is for the CS terminal a High level or a Low level, ON/OFF control of the pulse signal (the second driving signal) from the terminal OUT2 to the FET 17 can be performed. Note that the ON/OFF control of the pulse signal means that the pulse signal is or is not output from the terminal OUT2 to the FET 17. Further, note that the pulse signal (the second driving signal) has two kinds of signals, (i) a signal for driving the FET 17 and (ii) a signal for stopping the output voltage Vo. The High level and the Low level of the reference signal that is for the CS terminal is determined according to a predetermined internal voltage of the DC/DC converter control unit 35. When a voltage value of the reference signal is equal to or higher than the predetermined voltage, the reference signal is determined to be the High level. As a result, the pulse signal (the second driving signal) is output to the FET 17 from the terminal OUT2. When a voltage value of the reference signal is lower than the predetermined voltage, the reference signal is determined to be the Low level. As a result, the pulse signal (the second driving signal) is prevented from being output to the FET 17 from the terminal OUT2. By turning ON the FET 48 (a second switching element), the reference signal that is for the CS terminal moves to the Low level. As a result, the pulse signal (the second driving signal) is prevented from being output to the FET 17 from the terminal OUT2. Namely, by turning ON the FET 48, the switching operation of the FET 17 of the DC/DC converter circuit 11 is stopped. While a voltage is supplied to the power terminals of the DC/DC converter control unit 35, the DC/DC converter control circuit 35 is in the standby state in which the pulse signal (the second driving signal) is prevented from being output to the FET 17 from the terminal OUT2. Further, by turning OFF the FET 48, because states of the reference signal that is for the CS terminal are changed from the LOW level to the High level, the standby state of the DC/DC converter control unit 35 is canceled. As a result, the pulse signal (the second driving signal) is output to FET 17 from the terminal OUT2. Because the FET 17 of the DC/DC converter circuit 11 performs the switching operation, the output voltage Vo is supplied to a load 200. Note that the DC/DC converter control unit 35 is configured with an IC (integrated circuit).

Operation of Switching Power Supply Device

Figures 3, 4:
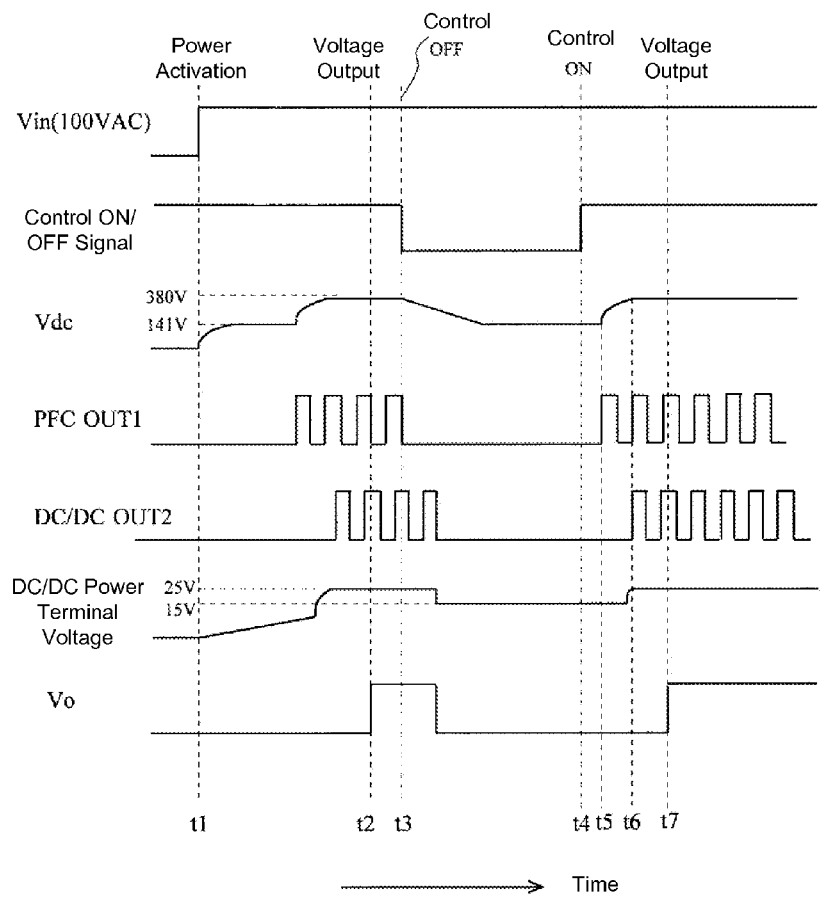
FIG. 3 is a timing diagram of each part for ON/OFF control of an output voltage of a switching power supply device by a switch of an external signal ON/OFF circuit.
FIG. 4 is a diagram that shows standby power consumption when only a DC/DC converter control unit is turned OFF (standby state) and when a PFC control unit and the DC/DC converter control unit are turned OFF (standby state) by a control ON/OFF circuit.

Next, the ON/OFF control of the output voltage Vo of the switching power supply device 1 by the remote control that is performed by turning ON/OFF the switch 56 of the external signal ON/OFF circuit 55 is explained with reference to FIG. 3 below. FIG. 3 is a timing diagram of each part for ON/OFF control of the output voltage Vo of the switching power supply device 1 by the switch 56 of the external signal ON/OFF circuit 55. Specifically, the timing diagram shown in FIG. 3 shows waveforms as follows in the order from the top to the bottom: the input voltage Vin, an output voltage of the external signal ON/OFF circuit 55 (shown as control ON/OFF signal), a DC voltage Vdc, the terminal OUT1 of the PFC control unit 30 (shown as PFC OUT1), the terminal OUT2 of the DC/DC converter control unit 35 (shown as DC/DC OUT2), a voltage of the power terminals of the DC/DC converter control unit 35, and the output voltage Vo.

First, an operation in which while the switch 56 of the external signal ON/OFF circuit 55 is turned ON, the input voltage Vin is applied to the switching power supply device 1 is explained. In FIG. 3, the timing diagram is shown when the input voltage Vin is 100 volt (V) (AC). As shown in FIG. 3, because the input voltage Vin (Vin is set to 100V) is applied at Time t1, a voltage is supplied to the rectifier circuit 3 and the step-up chopper circuit 5. Time t1 represents "power activation (power-up)." As a result, the DC voltage Vdc of the smoothing capacitor 10 of the step-up chopper circuit 5 gradually increases to "√2*Vin" (about 141V (1.41*100)) after the input voltage Vi is applied. Further, after the input voltage Vin is applied, a voltage, which is based on the DC voltage Vdc, is supplied to the power terminals of the PFC control unit 30 and the DC/DC converter control unit 35.

When the switch 56 is turned ON in the external signal ON/OFF circuit 55, a light-emitting part of the photocoupler 46 of the control ON/OFF circuit 45 is turned ON and a receiver of the photocoupler 46 is also turned ON. As a result, the external signal for the remote control branches to a first signal and a second signal. Specifically, the first signal is for the FET 47 that corresponds to the first switching element. The second signal is for the second switching element. As a result, the FET 47 to which the first signal is input is turned OFF and a start signal that corresponds to a signal from the DC voltage Vdc is input to the FB terminal of the PFC control unit 30. Then, the PFC control unit 30 outputs the pulse signal (the first driving signal) to the FET 7 of the step-up chopper circuit 5. Because the FET 7 of the step-up chopper circuit 5 performs the switching operation by the pulse signal (the first driving signal), the DC voltage Vdc of the smoothing capacitor 10 is stepped up to 380 volt.

Further, because the receiver of the photocoupler 46 is turned ON, the FET 48 is turned OFF. Specifically, the second signal for the second switching element that is delayed by a delay circuit is input to the FET 48, thereby, the FET 48 is turned OFF. As a result, the reference signal that is for the CS terminal of the DC/DC converter control unit 35 moves to the High level and the pulse signal (the second driving signal) is output to the FET 17 from the DC/DC converter control unit 35. As a result, the output voltage Vo is supplied to the load 200 at Time t2 from the DC/DC converter circuit 11. Time t2 represents "voltage output."

Next, the operation of the switching power supply device 1 is explained in a case in which the switch 56 of the external signal ON/OFF circuit 55 is switched to an OFF state from an ON state. As shown in FIG. 3, the switch 56 of the external signal ON/OFF circuit 55 is switched to the OFF state from the ON state at Time t3. As a result, the light-emitting part of the photocoupler 46 of the control ON/OFF circuit 45 is switched to the OFF state from the ON state at Time t3. The receiver of the photocoupler 46 is also switched to the OFF state from the ON state at Time t3. Time t3 represents "Control OFF." Therefore, because the first signal that corresponds to the output signal for the remote control is input to the FET 47 of the control ON/OFF circuit 45, the FET 47 is switched to the ON state from the OFF state. Thus, the start signal is not input to the FB terminal of the PFC control unit 30. As a result, the PFC control unit 30 prevents the pulse signal (the first driving signal) from the terminal OUT1 to the FET 7 (the PFC control unit 30 stops outputting the pulse signal (the first driving signal) to the FET 7 from the terminal OUT1). At this time, although the switching operation of the FET 7 of the step-up chopper circuit 5 is suspended (stops), the PFC control unit 30 changes to the standby state in which the voltage is supplied to the power terminals. As a result, the switching operation of the FET 7 of the step-up chopper circuit 5 is suspended (stops) and the DC voltage Vdc of the smoothing capacitor 10 gradually decreases to 141V. Further, after the pulse signal (the first driving signal) is prevented from being output to the FET 7 from the terminal OUT1 of the PFC control unit 30, the second signal that corresponds to the external signal for the remote control is input to the FET 48 of the control ON/OFF circuit 45 by the delay circuit. Thus, the FET 48 is switched to the ON state from the OFF state. Therefore, because the reference signal that is for the CS terminal of the DC/DC converter control unit 35 moves to the Low level from the High level, the pulse signal (the second driving signal) is prevented from being output to the FET 17 from the terminal OUT2. As a result, the switching operation of the FET 17 of the DC/DC converter circuit 11 is stopped. Further, the DC/DC converter control unit 35 is in the standby state in which the voltage is supplied to the power terminals of the DC/DC converter control unit 35 and in which the pulse signal (the second driving signal) is prevented from being output to the FET 17 from the terminal OUT2. At this time, the output voltage Vo is not output from the DC/DC converter circuit 11.

Next, the operation of the switching power supply device 1 is explained in a case in which the switch 56 of the external signal ON/OFF circuit 55 is switched to the ON state from the OFF state. As shown in FIG. 3, the switch 56 of the external signal ON/OFF circuit 55 is switched to the ON state from the OFF state at Time t4. As a result, the light-emitting part of the photocoupler 46 of the control ON/OFF circuit 45 is switched to the ON state from the OFF state at Time t4. Further, a transistor in the receiver of the photocoupler 46 is also switched to the ON state from the OFF state at Time t4. Time t4 represents "Control ON." As a result, the first switching element is turned OFF by the first signal that corresponds to the output signal for the remote control and the FET 47 of the control ON/OFF circuit 45 moves to the OFF state. Further, the start signal that corresponds to the signal from the DC voltage Vdc is input to the FB terminal of the PFC control unit 30. Because the start signal from the DC voltage Vdc is input to the FB terminal of the PFC control unit 30, the PFC control unit 30 outputs the pulse signal (the first driving signal) to the FET 7 from the terminal OUT1. As a result, because the switching operation of the FET 7 of the step-up chopper circuit 5 starts, the DC voltage Vdc of the smoothing capacitor 10 gradually increases to 380V.

Further, because the transistor of the receiver of the photocoupler 46 is turned ON, an electrical charge that is charged in the capacitor C1 is gradually discharged by the second signal that corresponds to the external signal for the remote control. As a result, the voltage that is applied to the gate of the FET 48 of the control ON/OFF circuit 45 gradually decreases. Then, because the FET 48 is finally turned OFF, the reference signal that is for the CS terminal of the DC/DC converter control unit 35 is in the High level. The FET 48 can switch the signal, which is for the CS terminal of the DC/DC converter control unit 35 of the control ON/OFF circuit 45, from the Low level to the High level. After the following events occur: the FET 47 is turned OFF; the start signal from the DC voltage Vdc is output to the FB terminal; the pulse signal (the first driving signal) is output to the FET 7 from the PFC control unit 30; and the switching operation of the FET 7 is performed, the FET 48 is turned OFF by the second signal (delay signal) that corresponds to the external signal for the remote control. In other words, the FET 48 is turned OFF after the external signal for the remote control is input to the control ON/OFF circuit 45 and is delayed by the delay circuit that is composed of the capacitor C1 and the resistor R1.

When the FET 47 is turned OFF, the pulse signal (the second driving signal) is output to the FET 17 from the DC/DC converter control unit 35 by inputting the High level signal to the CS terminal of the DC/DC converter circuit unit 35. As a result, the output voltage Vo is supplied to the load 200 from the DC/DC converter circuit 11 at Time t7. Time t7 represents "voltage output." Note that, the delay time, which is between a time in which the switch 56 of the external signal ON/OFF circuit 55 is switched to the ON state from the OFF state and a time in which the pulse signal (the second driving signal) is output to the FET 17 from the terminal OUT2 of the DC/DC converter control unit 35, is determined by a time constant of the capacitor and the resister of the integration circuit that corresponds to the delay circuit that is connected to the gate of the FET 48.

The standby power consumption in the switching power supply device that is composed of the above structures according to the embodiments of the present invention is measured. Efficacy and advantages according to the embodiments of the present invention are confirmed. FIG. 4 is a diagram that shows standby power consumption when only the DC/DC converter control unit 35 is in the standby state (turned OFF) and when the PFC control unit 30 and the DC/DC converter control unit 35 are in the standby state (turned OFF) by the control ON/OFF circuit 45 in the switching power device that has a state in which the input voltage Vin is applied. As shown in the FIG. 4, when only the DC/DC converter control unit 35 is in the standby state (conventional situation), the standby power consumption in the conventional switching power supply device is 1.38 W when the input voltage Vin is 100V. On the other hand, when the PFC control unit 30 and the DC/DC converter control unit 35 are in the standby state, the standby power consumption in the switching power supply device according to the embodiments of the present invention is 0.12 W when the input voltage Vin is 100V. Thus, the value of the standby power consumption is significantly improved. This is because the switching operation of the PFC circuit is stopped and a switching loss is decreased.

Figure 5:
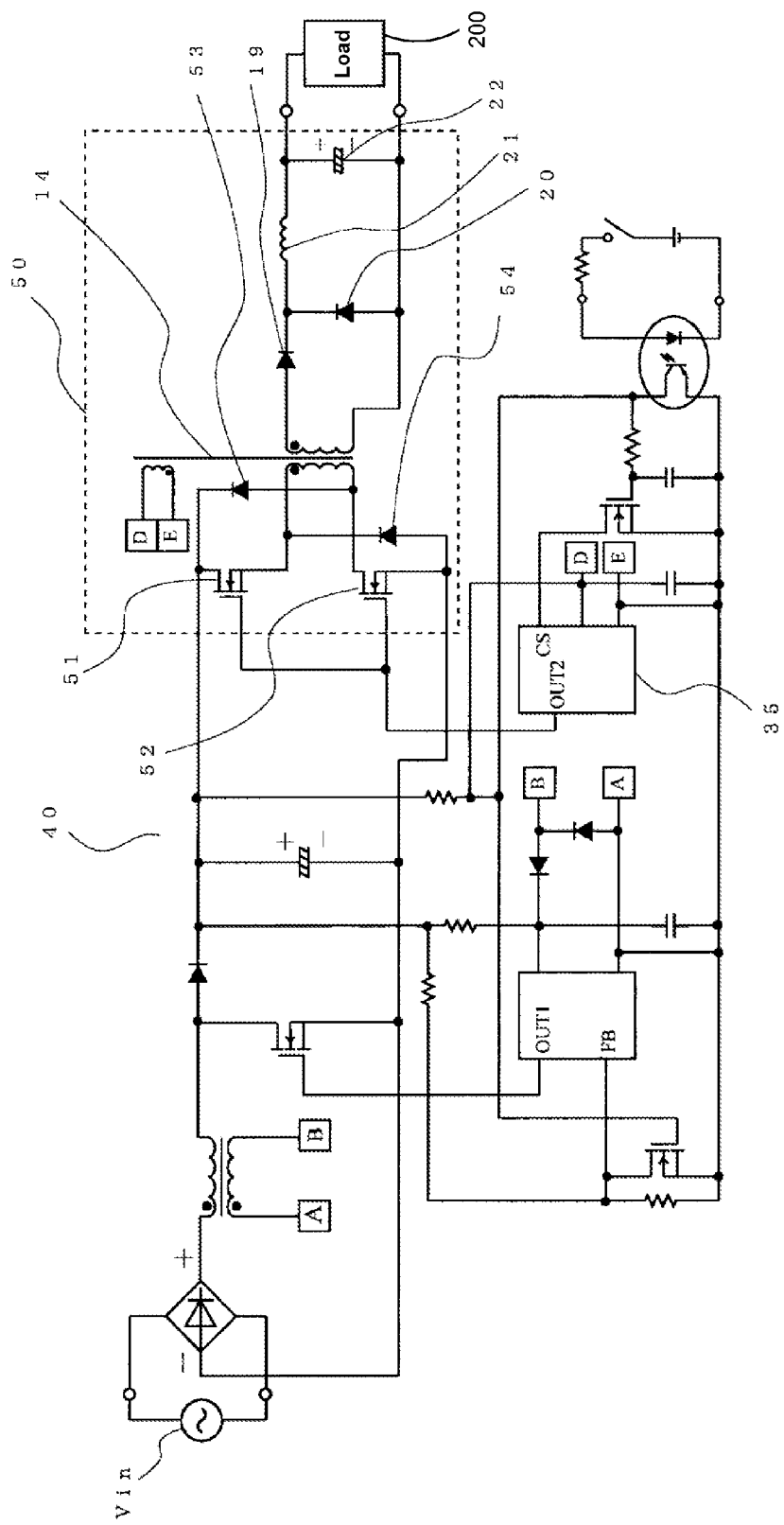
FIG. 5 is a circuit diagram that shows a configuration of a switching power supply device when a cascade forward circuit is used as a DC/DC converter circuit.

Further, a cascade forward circuit can also be used as a DC/DC converter circuit. FIG. 5 is a circuit diagram that shows a configuration of a switching power supply device in which a cascade forward circuit is used as a DC/DC converter circuit. A circuit configuration of a switching power supply device 40 shown in FIG. 5 is the same as the circuit configuration shown in the FIG. 2 except for a cascade forward circuit 50. As shown in FIG. 5, the cascade forward circuit 50 controls so as to turn ON/OFF the FETs 51, 52 that correspond to the switching elements at the same time. Withstand resistance of the switching elements can be decreased by using the cascade forward circuit 50 as the DC/DC converter circuit. Further, a reset winding does not need to be provided for the transformer 14 because a current that reverts/resets magnetic flux density of the transformer 14 flows in diodes 53, 54.

As explained above, the switching power supply device according to the embodiments of the present invention can reduce standby power consumption of the switching power supply device. This is because a PFC control unit and a DC/DC converter control unit are controlled to be in a standby state by a control ON/OFF circuit based on an external signal for remote control that is input from outside while the input voltage Vin of the switching power supply unit is applied and then switching operations of the PFC circuit and DC/DC converter circuit are stopped.

The control ON/OFF circuit of the switching power supply device according to the embodiments of the present invention inputs a start signal corresponding to the DC voltage Vdc to the PFC control unit based on the external signal for the remote control that is input from outside. Then, the PFC control unit operates the step-up chopper circuit and provides a predetermined DC voltage Vdc to the DC/DC converter circuit. Further, the control ON/OFF circuit performs the control as follows: after a first driving signal is output and an operation of the step-up chopper circuit becomes stable, the FET 48 turns OFF; when a reference signal that is for a CS terminal of the DC/DC converter control unit becomes a High level, a second driving signal is output from the DC/DC converter control unit to the FET 17 so as to turn ON the output voltage Vo of the DC/DC converter circuit; and as a result, because the external signal is turned ON, by the remote control, resuming output of the output voltage Vo is stably performed.

In the above embodiments, the ON/OFF states of the switching elements and signals, and input or not-input of the external signals are discussed for operating other elements/structures. However, the present invention is not limited to the above embodiments. The above conditions can be designed opposite. For example, ON/OFF states can be OFF/ON states, respectively. The input of the external signal can be not-input of the external signal, and vise versa.

The switching power supply device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A switching power supply device, comprising:
 a power factor correction circuit that has a step-up chopper circuit including a chopper switching element and a power factor correction control unit that controls a switching operation of the chopper switching element;
 a DC/DC converter circuit that has a transformer, a switching circuit, a rectifier circuit, a smoothing circuit, and a DC/DC converter control unit; and
 a control ON/OFF circuit that controls ON/OFF states of an output voltage of the DC/DC converter circuit, wherein
 the switching circuit is provided at a side of a primary winding of the transformer,
 the rectifier circuit and the smoothing circuit are provided at a side of a secondary winding of the transformer,
 the DC/DC converter control unit controls the switching circuit, and
 the control ON/OFF circuit controls the ON/OF states of the output voltage of the DC/DC converter circuit by controlling the power factor correction control unit and the DC/DC converter control unit so as to be in one of first and second external signal input states based on existence and non-existence of an external signal, wherein
 operations of the power factor correction control unit and the DC/DC converter control unit stop in the first external signal input state, and
 the operations of the power factor correction control unit and the DC/DC converter control unit start in the second external signal input state.

2. The switching power supply device according to claim 1, wherein
 the control ON/OFF circuit has a first switching element and a second switching element,
 when the first switching element is in a first state, the control ON/OFF circuit prevents a first driving signal for driving the step-up chopper circuit from being output from the power factor correction control unit, and
 when the second switching element is in a second state, the control ON/OFF circuit prevents a second driving signal for driving the switching circuit from being output from the DC/DC converter control unit.

3. The switching power supply device according to claim 2, wherein
the first state is an ON state, and the second state is the ON state.

4. The switching power supply device according to claim 3, wherein the first and second switching elements are turned ON according to the first and second external signal input states of the external signal for the control ON/OFF circuit.

5. The switching power supply device according to claim 4, wherein
when the external signal is not input to the control ON/OFF circuit in the first external signal input state, the first and second switching elements are turned ON.

6. The switching power supply device according to claim 5, wherein
ON/OFF states of the second driving signal are determined by a reference signal, and
when the reference signal is lower than a predetermined reference level, the control ON/OFF circuit prevents the second driving signal from being output from the DC/DC converter control unit.

7. The switching power supply device according to claim 6, wherein
the control ON/OFF circuit has the first switching element, the second switching element and a delay circuit,
after the external signal is input to the control ON/OFF circuit in the second external signal input state, a first signal for the first switching element and a second signal for the second switching element are generated based on the external signal,
after the first switching element is turned ON, the control ON/OFF circuit prevents a start signal for controlling the first driving signal for driving the step-up chopper circuit from being input into the power factor correction control unit so as to prevent the first driving signal from being output from the power factor correction control unit to the step-up chopper circuit, and
after the second switching element is turned ON by the second signal that is delayed by the delay circuit after the control ON/OFF circuit prevents the first driving signal from being output to the step-up chopper circuit, the control ON/OFF circuit prevents the second driving signal from being output from the DC/DC converter control unit to the switching circuit so as to make the output voltage of the DC/DC converter circuit in an OFF state.

8. The switching power supply device according to claim 2, wherein
ON/OFF states of the second driving signal are determined by a reference signal, and
when the reference signal is lower than a predetermined reference level, the control ON/OFF circuit prevents the second driving signal from being output from the DC/DC converter control unit.

9. The switching power supply device according to claim 7, wherein
the DC/DC converter circuit is a cascade forward circuit.

10. The switching power supply device according to claim 1, wherein
the DC/DC converter circuit is a cascade forward circuit.

11. The switching power supply device according to claim 1, wherein
the control ON/OFF circuit has a first control signal generation circuit that operates the power factor correction control unit, a second control signal generation circuit that operates the DC/DC converter control unit, and a delay circuit,
the step-up chopper circuit is driven by operating the power factor correction control unit according to an operation of the first control signal generation circuit and according to the first and second external signal input states of the external signal for the control ON/OFF circuit,
after the step-up chopper circuit is driven, the DC/DC converter circuit is driven by operating the second control signal generation circuit in which an operation of the second control signal generation circuit is delayed by the delay circuit,
when the DC/DC converter circuit is driven, the output voltage of the DC/DC converter circuit is in an ON state.

12. The switching power supply device according to claim 11, wherein
when the external signal is input to the control ON/OFF circuit in the second external signal input state, the step-up chopper circuit is driven by operating the power factor correction control unit according to the operation of the first control signal generation circuit.

13. The switching power supply device according to claim 1, wherein
the control ON/OFF circuit has a first switching element, a second switching element and a delay circuit,
after the external signal is input to the control ON/OFF circuit in the second external signal input state, a first signal for the first switching element and a second signal for the second switching element are generated based on the external signal,
after a start signal is input to the power factor correction control unit by turning OFF the first switching element by the first signal, the power factor correction control unit outputs a first driving signal to the step-up chopper circuit so as to drive the step-up chopper circuit,
after the second switching element, which is connected to the DC/DC converter control unit, is turned OFF by the second signal that is delayed by the delay circuit after the step-up chopper circuit is driven, the DC/DC converter control unit outputs a second driving signal to the switching circuit so as to make the output voltage of the DC/DC converter circuit in an ON state by driving the DC/DC converter circuit.

14. The switching power supply device according to claim 13, wherein
the DC/DC converter circuit is a cascade forward circuit.

15. The switching power supply device according to claim 1, wherein
the control ON/OFF circuit has a first control signal generation circuit that operates the power factor correction control unit, a second control signal generation circuit that operates the DC/DC converter control unit, and a delay circuit,
a first signal for the first control signal generation circuit and a second signal for the second control signal generation circuit are generated based on the external signal and according to the first and second external signal input states of the external signal for the control ON/OFF circuit,
after the first signal is input to the first control signal generation circuit, the step-up chopper circuit is driven by operating the power factor correction control unit according to an operation of the first control signal generation circuit,
after the step-up chopper circuit is driven, the DC/DC converter circuit is driven by operating the second control signal generation circuit by inputting the second signal that is delayed by the delay circuit, when the DC/DC converter circuit is driven, the output voltage of the DC/DC converter circuit is in an ON state.

16. The switching power supply device according to claim 15, wherein when the external signal is input to the control ON/OFF circuit in the second external signal input state, the first signal for the first control signal generation circuit and the second signal for the second control signal generation circuit are generated based on the external signal.

17. The switching power supply device according to claim 1, wherein the control ON/OFF circuit has a first switching element, a second switching element and a delay circuit, after the external signal is input to the control ON/OFF circuit in the second external signal input state, a first signal for the first switching element and a second signal for the second switching element are generated based on the external signal, after the first switching element is turned ON, the control ON/OFF circuit prevents a start signal for controlling a first driving signal for driving the step-up chopper circuit from being input into the power factor correction control unit so as to prevent the first driving signal from being output from the power factor correction control unit to the step-up chopper circuit, and after the second switching element is turned ON by the second signal that is delayed by the delay circuit after the control ON/OFF circuit prevents the first driving signal from being output to the step-up chopper circuit, the control ON/OFF circuit prevents the second driving signal for driving the switching circuit from being output from the DC/DC converter control unit to the switching circuit so as to make the output voltage of the DC/DC converter circuit in an OFF state.

18. The switching power supply device according to claim 17, wherein when the external signal is not input to the control ON/OFF circuit in the first external signal input state, the first and second switching elements are turned ON.

19. The switching power supply device according to claim 17, wherein the DC/DC converter circuit is a cascade forward circuit.

* * * * *